US005690794A

United States Patent [19]
Molchanov et al.

[11] Patent Number: 5,690,794
[45] Date of Patent: Nov. 25, 1997

[54] METHOD OF GROWING DIAMOND FROM GRAPHITE

[75] Inventors: Alexandr Georgievich Molchanov; Vladislav Borisovich Rozanov, both of Troitsk, Russian Federation

[73] Assignee: Fizichesky Institut Imeni P.N./Lebedeva Rossiiskoi Akademii Nauk, Moscow, Russian Federation

[21] Appl. No.: 657,549

[22] Filed: Jun. 4, 1996

[30] Foreign Application Priority Data

Jun. 7, 1995 [RU] Russian Federation ........... 95 109547

[51] Int. Cl.$^6$ .......................... C01B 31/00; C01B 31/06; B01J 3/06
[52] U.S. Cl. .................. 204/157.47; 204/157.4; 204/157.41; 204/157.15; 423/446
[58] Field of Search .................... 204/157.15, 157.4, 204/157.41, 157.47; 423/446

[56] References Cited

U.S. PATENT DOCUMENTS

| | | | |
|---|---|---|---|
| 4,536,442 | 8/1985 | Bovenkerk et al. | 428/323 |
| 5,360,477 | 11/1994 | Inoue et al. | 117/4 |
| 5,366,556 | 11/1994 | Prince et al. | 118/722 |
| 5,462,772 | 10/1995 | Lemelson | 427/554 |

OTHER PUBLICATIONS

Ming et al. (Rev. Sci. Instrum., vol. 45, No. 9, Sep. 1974, 1115–1118) Sep. 1974.

L.E. Shterenberg & V.N. Slesarev, "The Effect of Dopants on the Amount of Diamond Synthesized in the Presence of Catalyst Metals," in L. Vereschagin, Synthetic Diamonds and Hydrostatic Extrusion General Editorial Board for Foreign Language Publications, Moscow 1987.

F.P. Bundy, "Direct Conversion of Graphite to Diamond in Static Pressure Apparatus," pp. 631–643, *Journal of Chemical Physics*, vol. 38, No. 3, Feb. 1, 1963.

*Primary Examiner*—T. Tung
*Assistant Examiner*—Alexander Noguerda
*Attorney, Agent, or Firm*—Brumbaugh, Graves, Donohue & Raymond

[57] ABSTRACT

A method is proposed for growing diamond from graphite, including placing a sample of graphite in a high pressure chamber, applying a pulse-periodical laser radiation having a wavelength in the region of transmission of diamond to the sample of graphite, wherewith absorption of the pulse of laser radiation takes place in the skin-layer of graphite and the graphite is heated in the region of the skin-layer to the temperature of graphite-to-diamond phase transition. After cooling the produced layer of diamond, the steps of heating successive layers of the sample of graphite with pulses of laser radiation and cooling said layers are repeated until complete transformation of the graphite to diamond.

14 Claims, 1 Drawing Sheet

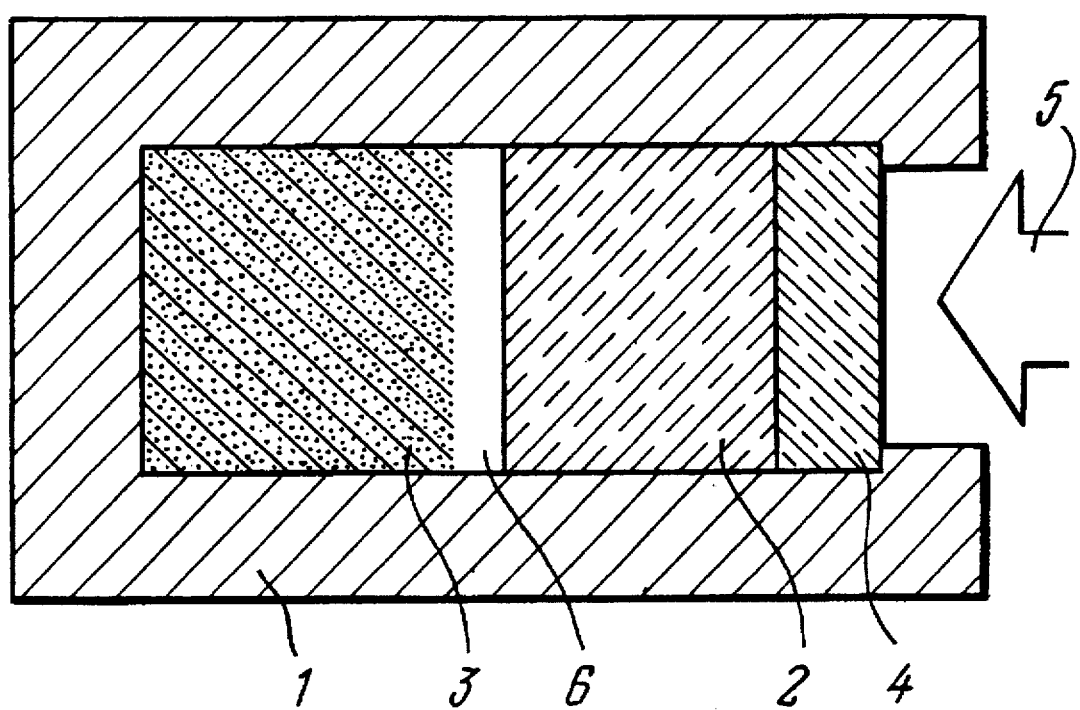

METHOD OF GROWING DIAMOND FROM GRAPHITE

FIELD OF THE INVENTION

The invention relates to the production of synthetic diamonds, more particularly to a method for growing diamond from graphite.

It is well known that diamond has unique physical and chemical properties. It is one of the hardest and least compressible substances, and is characterized by an extremely high electrical breakdown field, by high chemical resistance to acids and by thermal conductivity several times greater than the thermal conductivity of copper at room temperature. These properties result in the wide use of diamonds in such branches of industry as electronics, machine-building, production of drilling tools and abrasives, medicine, jewelry etc.

BACKGROUND ART

Various methods are known at present for the synthetic growth of diamonds. The most wide spread method is crystallization of diamond from a solution of carbon in molten metal (see Vereshagin L. Synthetic diamonds and hydrostatic extruction [selected papers]. Moscow, 1987). This method is characterized by a low rate of synthesis, which does not exceed about $10^{-6}$ cm/s, and by the presence of metallic impurities in synthesized diamond.

Another method, similar to the one described above, is synthesis of diamond from noncrystalline forms of carbon, which is obtained by thermal decomposition of hydrocarbons in a condensed state (see Voronov O. A. Rakhmanin A. V. Kinetics of carbonization of naphthalene under a pressure of 8 GPa. Inorganic Materials, v. 28, No. 7, p. 1408, 1992). Even though metallic impurities are eliminated in this method, the rate of synthesis remains just as low as in the preceding case.

One more known method consists of growing epitaxial films of diamond from a gas phase (see Deryagin B. V., Fedoseev D. V. Growth of diamond and graphite from a gas phase. Nauka, Moscow, 1977). The production of atomic carbon in this case takes place as a result of thermal decomposition of hydrocarbons in gaseous mixtures with hydrogen. The rate of growth in this method is not high either, while the quality of the produced diamond films is inferior to that of monocrystalline samples.

The aforecited known solutions can be related to the class of methods for the growth of diamonds by diffusion. Another large class of methods for growing diamond relates to the so-called direct transformation of graphite into diamond. It is known that at room temperature with hydrostatic compression of graphite, the formation of a diamond structure does not take place at pressures up to 80 GPa. In order to produce a diamond phase it is necessary to additionally either provide plastic shear deformation or increase the temperature. The formation of a diamond phase with plastic shear deformation at room temperature was observed in experiments when high pressure was applied using a diamond anvil, one side of which can rotate (see Blank V. D. et al. Diamond chamber for investigation of solid bodies with the simultaneous application of shear deformation and pressure up to 24 GPa. Pribori i tekhnika eksperimenta, No. 2, 1990, p. 186). At a pressure of 19 GPa and shear deformation of about 3 GPa diamond nuclei begin to grow in the amorphous phase of the graphite. If there is only a single-axis compression of a monocrystal of graphite at room temperature a reversible transition to an amorphous phase at a pressure of 13 GPa is observed (see Funcy F. P., Kasper J. S. Hexagonal Diamond—A new form of carbon. J. Chem. Phys., v. 46, No. 9, 1967, p. 3437). Heating the compressed sample above 1300 K at that pressure results in the formation and growth of lonsdaleite. The produced phase is maintained when the temperature and pressure are sequentially removed. Further heating to 2000 K results in a transition of the lonsdaleite to diamond. The size of diamond particles thus grown is tens of microns.

Intensive plastic deformations in the graphite take place simultaneously with its compression behind the fronts of strong shock waves, as a result of which at pressures of 20–40 GPa behind the front, a phase transition of the graphite into diamond is observed (see Erskine D. J., Nellis W. J. Shock-induced martensic transformation of highly oriented graphite to diamond. J. Appl. Phys., v. 71, No. 10, 1992, p. 4882). However due to maintaining high temperatures behind the shock wave after removing the load on the samples, almost complete annealing of the synthesized diamond takes place, i.e. a transition back to graphite occurs, and the yield of diamond powder does not exceed fractions of a percent.

A method is also known for synthesizing diamond from graphite by heating the graphite with an electric current pulse while simultaneously compressing the heated sample with the inherent magnetic field of the electric current (see Bushman A. V. et al. On the possibility of electroexplosive synthesis of artificial diamonds. DAN, v. 315, No. 5, 1990, p. 1124). However rapid removal of heat and maintenance of the diamond phase in those methods remains relatively complex and is a problem yet to be solved. A mixture of graphite with powders of metals is most often used for the rapid removal of heat in the case of shock load, which mixture, due to lesser compressibility as compared with graphite, is heated to a substantially lesser degree and plays the part of coolers (see U.S. Pat. No. 3,401,019). Copper-graphite mixtures with the content of graphite being up to 8% by weight are used during industrial synthesis of diamonds, of which 75% is converted into diamond powder. Wherein the size of diamond polycrystals vary from 0.1 to 60 µm, while the average size of the particles composing the polycrystals is equal to about 10 nm. The shock method for synthesis of diamond with a yield up to 50% by weight of the initial graphite may also be carried out by shock compression of graphite in a mixture with condensed inert gases (H, He, Ar) and subsequent rapid cooling of the solid phase by heat removal in a rapidly cooling inert gas during adiabatic unloading (see PCT application PCT/SU 80/00136, 1982). Wherein the yield of diamond is approximately the same as in the case of mixtures of graphite and metallic powders. In both cases the diamonds obtained are of small size, not exceeding 100 microns, and as a rule are not transparent.

The solution most similar to the invention in respect of technical essence is the method for synthesizing diamond from graphite by applying high pressure to the graphite and heating it with an electric current pulse (see Bundy F. R. Direct conversion of graphite to diamond in static pressure apparatus. J. Chem. Phys., v. 38, No. 3, 1963, pp. 631–643). In accordance with this method a pressure of up to 20 GPa is created in a diamond anvil and the heating temperature reaches 5000 K. In a concrete example of implementation of this method synthesis of diamond took place in a graphite cylinder 3 mm high and 2 mm in diameter, through which electric current was passed, in a pressure range of from 10 to 20 GPa and in a temperature interval of from 3000 to 4000 K. However due to the nonuniform heating of the initial material, it is only possible using this method to obtain dark polycrystalline samples of diamond.

SUMMARY OF THE INVENTION

An object of the invention is to create a method which makes it possible to overcome the drawbacks of the aforesaid solutions which are known from prior art.

Another object of the invention is to ensure the production of transparent diamonds of substantially larger volume.

These objects are achieved in a method for growing diamond from graphite in accordance with the invention by placing a sample of graphite in a high pressure chamber in which a predetermined high pressure is maintained during the whole process of growing diamond; applying pulse-periodical laser radiation with a wavelength in the transmission region of the diamond to the sample of graphite, wherein the pulse of laser radiation is absorbed in the skin-layer of the graphite and the graphite is heated to the temperature of the phase transition of graphite; cooling the produced layer of diamond, and repeating the heating of successive layers of the sample of graphite with pulses of laser radiation and the cooling of those layers until complete transformation of graphite into diamond is accomplished.

Wherein it is preferable that the pressure in the high pressure chamber be maintained within the limits of from 5 to 50 GPa, while the wavelength of the pulse-periodical laser radiation be selected within the range of from 0.2 to 5 µm.

Wherewith the temperature to which the layer of graphite is heated by the absorbed pulse of pulse-periodical laser radiation is adjusted by changing its intensity, preferably selected from the condition: $I_0 t_0 \geq 0.1$ J/cm², where $I_0$ is the average intensity of the pulse-periodic laser radiation in a pulse, the length of which is to.

It is also preferable that the repetition period of the pulses of the pulse-periodical laser radiation be selected to be sufficient to ensure the removal of heat from the heated layer of graphite. Furthermore, it is preferable that the aforesaid laser radiation be applied to the graphite at least through two sections of the wall of the high pressure chamber which are made of a material transparent to laser radiation with a selected wavelength, for example, of sapphire, boron nitride or diamond.

Furthermore, the aforesaid objects are attained in a method for growing diamond from graphite in accordance with the invention by placing a sample of graphite in a high pressure chamber in which a predetermined pressure is maintained during the whole process of growth of the diamond, and applying laser radiation in the ultraviolet range of the spectrum in the region of transmission of the diamond to the graphite, as a result of which photochemical action of the laser radiation is effected on the skin-layer region of graphite, thus ensuring rearrangement of the valence bonds of the graphite and resultant phase transition.

Preferably the pressure in the high pressure chamber should be maintained within the limits of from 5 to 50 GPa.

It is also preferable that continuous laser radiation be used, the action of which on the graphite be carded out at least through two sections of the high pressure chamber, which sections are made of a material transparent to the aforesaid laser radiation.

Furthermore, preferably the intensity of the laser radiation in the ultraviolet range is selected from the condition of ensuring the heating of the skin-layer of the graphite to a temperature restating in an increase of the efficacy of the photochemical action relative to the initial state at ambient temperature.

BRIEF DESCRIPTION OF THE DRAWING

Below the invention is explained by concrete embodiments of the invention with reference to the accompanying drawing on which a high pressure chamber for growing diamond from graphite is shown.

DESCRIPTION OF THE PREFERRED EMBODIMENTS OF THE INVENTION

As is known, in order for laser radiation to pass through a diamond being grown, it is necessary that the energy quantum of a photon hv would not exceed the energy of the forbidden zone of diamond Eo≅5.2 eV, i.e. the wavelength of the laser should exceed 230 nm. On the other hand, the wavelength of the laser radiation should not extend into the far infrared region in which impurity and lattice absorption of diamond begins, i.e. the wavelength should be less than about 5 µm. Laser radiation in graphite is absorbed at the depth of the skin-layer $\delta = c/(2 \times \sigma \omega)^{1/2}$, where $\sigma=820$ ohm$^{-1}$ cm$^{-1}$ is the specific conductivity of graphite, ω is the frequency of the laser radiation. For an Nd laser (with a wavelength of 1.06 µm), the depth of the skin-layer in graphite is δ=0.26 µm, while for a XeCl laser (with a wavelength of 0.31 µm) it is 0.14 µm, i.e. it can be taken that δ≅0.2 µm over the whole optical band.

The cooling time for the thin heated layer with a thickness δ is approximately equal to $\Delta t = \delta^2/a$, where $a=k/\rho C$ is the thermal diffusivity, k is the thermal conductivity, ρ is the density, C is the heat capacity. The thickness of the heated layer δ is approximately equal to 0.2 µm. Using the known values for diamond k=10 W/cm·degree, ρ=3.5 g/cm³, C=2 J/degree, a characteristic value of the cooling time for the layer Δt=1 ns is obtained.

The character of change in time of the temperature of the layer being heated is found from the thermal conductivity equation, the solution of which for pulse-periodical laser radiation with square pulses [I(t)=$I_0$ for 0<t<$t_0$, I(t)=0 for remaining time] provides the condition for heating the graphite in the skin-layer to the necessary temperature which is equal to the so-called graphitization temperature, approximately equal to 2000 K. This condition is expressed by $I_0 t_0 \geq 0.1$ J/cm². At an intensity $I_0$, approximately equal to 50 MW/cm², the aforesaid temperature is reached in a time of approximately 2 ns. After the heated layer has cooled and it has been converted into a diamond layer, the process may be repeated for the subsequent layer of graphite with its subsequent conversion into a new layer of diamond etc. The time interval between successive laser pulses is determined by the total time taken to remove heat into the walls of the high pressure chamber and depends on its size. The average density of the power of laser radiation is determined by the possibilities of the chamber for cooling and may reach approximately 10 kW/cm².

A high pressure chamber 1 for synthesizing a diamond phase 2 with laser radiation applied to graphite 3 in a compressed state through a transparent section 4 in the wall of the high pressure chamber is shown in the drawing. Wherein absorption of the laser radiation 5 takes place in the skin-layer 6 region of the graphite 3.

The use of laser radiation to heat the graphite 3 (and in a more general case, and other nontransparent carbon-comprising substances) pressed against the diamond 2 results in a new quality result. Due to the anomalously small depth of the layer 6 being heated and the resultant large temperature gradient, and also due to the large value of the thermal conductivity of diamond, heat from the thin heated layer passes into the surrounding walls of the high pressure chamber 1 during an anomalously short time. Wherein the large temperature gradient also causes tangential stresses in the material which promote the formation of diamond. Changing the intensity of the laser pulse 5, it is possible to create practically any temperatures in the layer 6 of graphite 3 from the initial temperature to a temperature of approximately 5000 K and more. The upper limit of the pressure in chamber I is determined by the type of chamber creating the outer specific pressure and may reach several tens of GPa. After one layer 6 of the graphite 3 has been heated and converted into diamond 2, the next pulse of laser radiation 5 passes through the formed diamond layer 2 and heats the next layer of graphite etc. Thus, the process may be repeated a plurality of times, until all the irradiated graphite is converted into diamond. As distinctive from heating with electric current, laser radiation even heats nontransparent inclusions of graphite randomly formed in the diamond, converting them into diamond. As a result the production of extremely pure and transparent diamond samples in large quantities is ensured.

Example of a Specific Embodiment

The graphite is placed in a high pressure chamber, a section of one of the walls of which is transparent to laser radiation having a selected wavelength. Using a hydrostatic press, the pressure in the chamber is maintained constant at a level of approximately 20 GPa. Pulse-periodic laser radiation in the form of a second harmonic of an Nd-laser having a wavelength of 0.53 μm is transmitted through the transparent section of the wall of the chamber. The product of the density of intensity of the pulse multiplied by the length of the pulse satisfies the condition $I_0 t_0 > 0.2$ J/cm$^2$. At an intensity $I_0$ approximately equal to 50 MW/cm$^2$, a temperature of 1000 K is reached in 2 ns. After cooling the layer during approximately the same length of time and converting it into diamond, the following laser pulse heats the next layer of compressed graphite, and the process continues until full transformation of graphite into diamond. After the laser radiation has been turned off and the pressure removed the produced diamond is taken out of the chamber.

In accordance with the second embodiment of the invention, laser radiation in the ultraviolet region of the spectrum is used. This short wave laser radiation, in addition to pure thermal action on the graphite, can promote the transformation of compressed graphite into diamond, stimulating rearrangement of valence bonds characteristic for a diamond structure. Wherein synthesis of the diamond can take place without substantial increase of the temperature by the photochemical action of laser radiation on the phase transition of compressed graphite-diamond. In this case continuous laser radiation of weak intensity can be used for synthesis of diamond. Wherein additional heating of the skin-layer by laser radiation of increased intensity can increase the efficacy of the photochemical action relative to the initial value of the efficacy at ambient temperature.

The velocity of the border of growth of diamond may be determined by the equation: $v_d = I/(\Delta E N)$, where I is the average intensity of laser radiation, absorbed in the graphite, ΔE is a characteristic energy necessary for the rearrangement of one atom of carbon from the lattice of graphite into the lattice of diamond, approximately determined as $\Delta E = kT$, where T is the temperature of graphitization, approximately equal to 2000 K, $N = 10^{22}$ cm$^{-3}$ is the density of carbon atoms. At an average density of the laser power absorbed in the graphite equal to 10 W/cm$^2$, the velocity of growth of diamond should be approximately 1 mm/s.

The size of the grown diamonds is determined by the magnitude of the space in which the pressure necessary for the synthesis of diamonds is created by an external device, for example a hydrostatic press. At present the magnitude of the space in which high pressure is created may reach several cubic centimeters. Wherein the input of laser radiation into the chamber may be effected in the form of diverging beams of laser radiation through several small transparent sections of the walls of the chamber.

The method according to the invention ensures both a high rate of growth and high purification of the produced diamonds, since it is not related to the me of catalysts and the introduction of additional impurities in the process of growing. This method may be used to stimulate the growth of any substance transparent to laser radiation, which is in contact with a nontransparent material used as the initial product.

We claim:

1. A method of growing diamond from graphite, comprising the following steps:

providing a high pressure chamber;

placing a sample consisting essentially of compressed graphite in said chamber;

maintaining an essentially constant high pressure during the whole process of growing diamond;

applying a pulse of pulse-periodical laser radiation having a wavelength in the transmission region of diamond to said sample of graphite so as to heat the heating the skin-layer of said sample of graphite with said laser radiation pulse absorbed in that layer to the graphite-to-diamond phase transition temperature and produce a layer of diamond from said skin-layer, wherein said layer is transparent to subsequent applications of pulse-periodical laser radiation such that a subsequent application will reach a next skin-layer of graphite underlying and adjacent said layer of diamond; and cooling said layer of diamond.

2. A method of growing diamond from graphite, comprising the following steps:

a) providing a high pressure chamber;

b) placing a sample consisting essentially of compressed graphite in said chamber;

c) maintaining an essentially constant high pressure during the whole process of growing diamond;

d) applying a pulse of pulse_periodical laser radiation having a wavelength in the transmission region of diamond to said sample of graphites so as to heat the heating the skin-layer of said sample of graphite with said pulse of said laser radiation absorbed in that layer to the temperature of graphite-to-diamond phase transition and produce a layer of diamond from said skin-layer such that a subsequent application will reach a next skin-layer of graphite underlying and adjacent said layer of diamond;

e) cooling said layer of diamond; and f) repeating steps (d) and (e) for successive layers of said sample of graphite until the completion of the transformation of graphite into diamond.

3. A method as in claim 2 wherein said pressure in said high pressure chamber is maintained within the limits of from 5 to 50 GPa.

4. A method as in claim 2 wherein said wavelength of said laser radiation is selected within the range of from 0.2 to 5 μm.

5. A method as in claim 2 wherein the temperature to which said layer of said sample of graphite with the absorbed said pulse of laser radiation is heated is adjusted by changing the intensity of said laser radiation.

6. A method as in claim 5 wherein said intensity of said laser radiation is selected from the condition $I_0 t_0 > 0.1$ J/cm$^2$, where $I_0$ is the average intensity of said pulse-periodical laser radiation in a pulse, the duration of which is $t_0$.

7. A method as in claim 5 wherein the repetition period of the pulses of said laser radiation is selected to be sufficient for removal of heat from said heated layer of the sample of graphite.

8. A method as in claim 2 wherein at least two sections of the chamber wall are provided made of a material which is transparent to said laser radiation having a selected wavelength, and said laser radiation acts on said sample of graphite through said at least two sections.

9. A method as in-claim 8 wherein material from the group consisting of sapphire, boron nitride and diamond is selected as the material of said sections of the chamber wall.

10. A method for growing diamond from graphite, comprising the following steps:

providing a high pressure chamber;

placing a sample consisting essentially of compressed graphite in said chamber;

maintaining a high pressure during the whole process of growing diamond;

applying laser radiation in the ultraviolet range of the spectrum in the transmission region of diamond to said sample of graphite so as to transform the skin-layer of said sample of graphite into a layer of diamond as a result of photochemical application of said laser radiation to said skin-layer of the sample of graphite, ensuring rearrangement of the valence bonds of the graphite, resulting in a diamond-graphite phase transition that produces layer of diamond that is transparent to laser radiation such that subsequent treatments by laser radiation will reach the skin-layer of graphite underlying and adjacent said layer of diamond.

11. A method as in claim 10 wherein the pressure in said high pressure chamber is maintained within the limits of from 5 to 50 GPa.

12. A method as in claim 10 wherein continuous laser radiation in the ultraviolet range is used as said laser radiation in the ultraviolet range.

13. A method as in claim 10 wherein at least two sections of the wall of the high pressure chamber are provided which are made of a material transparent to said laser radiation, and the laser radiation is applied to said sample of graphite through said at least two sections.

14. A method as in claim 10 wherein the intensity of said laser radiation in the ultraviolet range ensures the heating of the skin-layer of the sample of graphite to a temperature at which the efficacy of said photochemical action is enhanced relative to the initial value at ambient temperature.

* * * * *

UNITED STATES PATENT AND TRADEMARK OFFICE
CERTIFICATE OF CORRECTION

PATENT NO. : 5,690,794
DATED : November 25, 1997
INVENTOR(S) : Molchanov et al.

Page 1 of 2

It is certified that error appears in the above-identified patent and that said Letters Patent is hereby corrected as shown below:

On the Title Page: Under Item 56, Other Publications line 3 delete "Sep. 1974";

Column 3, line 58, "carded" should read --carried--;

Column 3, line 65, "restating" should read --resulting--;

Column 4, line 20, "$c/(2x\sigma\omega)^{1/2}$" should read --$c/(2\pi\sigma\omega)^{1/2}$--;

Column 6, line 12, "me" should read --use--;

Column 6, line 46, "pulse_periodical" should read --pulse-periodical--;

UNITED STATES PATENT AND TRADEMARK OFFICE
CERTIFICATE OF CORRECTION

PATENT NO. : 5,690,794
DATED : November 25, 1997
INVENTOR(S) : Molchanov et al.

It is certified that error appears in the above-identified patent and that said Letters Patent is hereby corrected as shown below:

Column 6, line 48, "graphites" should read --graphite,--;

Column 6, line 49, "heating the" should read --the--;

Column 8, line 7, "layer" should read --a layer--.

Signed and Sealed this

First Day of September, 1998

BRUCE LEHMAN

Attest:

Attesting Officer

Commissioner of Patents and Trademarks